United States Patent
Matsumura et al.

(10) Patent No.: US 7,346,237 B2
(45) Date of Patent: Mar. 18, 2008

(54) OPTICAL FIBER COUPLING PART

(75) Inventors: Hiroyoshi Matsumura, Saitama (JP); Taro Suzuki, Tokyo (JP)

(73) Assignee: Toyo Glass Co., Ltd., Tokyo (JP)

( * ) Notice: Subject to any disclaimer, the term of this patent is extended or adjusted under 35 U.S.C. 154(b) by 0 days.

(21) Appl. No.: 10/538,510

(22) PCT Filed: Sep. 28, 2004

(86) PCT No.: PCT/JP2004/014181

§ 371 (c)(1),
(2), (4) Date: Jun. 9, 2005

(87) PCT Pub. No.: WO2005/036230

PCT Pub. Date: Apr. 21, 2005

(65) Prior Publication Data

US 2006/0045419 A1    Mar. 2, 2006

(30) Foreign Application Priority Data

Oct. 8, 2003    (JP) ............................ 2003-350075

(51) Int. Cl.
*G02B 6/32*    (2006.01)

(52) U.S. Cl. ...................................... 385/34

(58) Field of Classification Search ................... 385/34
See application file for complete search history.

(56) References Cited

U.S. PATENT DOCUMENTS

| | | | |
|---|---|---|---|
| 3,910,677 A | 10/1975 | Becker et al. | |
| 4,701,011 A | 10/1987 | Emkey et al. | |
| 5,384,874 A | 1/1995 | Hirai et al. | |
| 5,865,867 A | 2/1999 | Kinoshita | |
| 5,881,195 A | 3/1999 | Walker | |
| 6,594,419 B2 * | 7/2003 | Ukrainczyk et al. | ........... 385/33 |
| 2002/0150333 A1 | 10/2002 | Reed et al. | |

FOREIGN PATENT DOCUMENTS

| | | |
|---|---|---|
| EP | 1 260 841 | 7/2007 |
| JP | 62-296105 | 12/1987 |
| JP | 4-260609 | 9/1992 |
| JP | 7-149525 | 6/1995 |
| JP | 7-333463 | 12/1995 |

(Continued)

OTHER PUBLICATIONS

Yamagishi et al., "Gradient-index rod lens with high N.A.", Applied Optics, vol. 22, No. 3, Feb. 1, 1983.*

(Continued)

*Primary Examiner*—Michelle Connelly-Cushwa
*Assistant Examiner*—Jerry T. Rahll
(74) *Attorney, Agent, or Firm*—Wenderoth, Lind & Ponack, L.L.P.

(57) ABSTRACT

An optical fiber coupling part capable of reducing coupling loss while maintaining a large operating distance, and having a good module assembling property. AT least one GRIN lens having numerical aperture NA that is larger than numerical aperture NAs of a light-emitting source (such as a semiconductor laser) is fusion-spliced with one end of the optical fiber. All lights emitted from the light-emitting source can enter the GRIN lens, and the loss of the light can thereby be reduced. In addition, a second GRIN lens having numerical aperture $NA_2$ is fusion-spliced with one end of the optical fiber having numerical aperture $NA_f$, and further a first GRIN lens having numerical aperture $NA_1$, which is larger than numerical aperture $NA_2$, is fusion-spliced with the other end of the second GRIN lens. Thereby, the light emitted from the light-emitting source can efficiently enter the optical fiber, and loss of the light can thereby be reduced. In this case, the formula expressed by $NA_f \leq NA_2 < NA_s \leq NA_1$ is desirable.

8 Claims, 4 Drawing Sheets

FOREIGN PATENT DOCUMENTS

| | | |
|---|---|---|
| JP | 8-292341 | 11/1996 |
| JP | 2001-521633 | 11/2001 |
| JP | 2002-182073 | 6/2002 |
| JP | 2002-350666 | 12/2002 |
| JP | 2003-227963 | 8/2003 |
| WO | 97/29392 | 8/1997 |
| WO | 03/076992 | 9/2003 |
| WO | 03/076994 | 9/2003 |

OTHER PUBLICATIONS

Kitano et al., "Gradient-index lens for low-loss coupling of a laser diode to single-mode fiber", Applied Optics, vol. 25, No. 19, Oct. 1, 1986.*

T. Sakamato, "Laser-Diode/Mutlimode-Fibre Couling Analysis Using A Planoconvex GRIN Lens", Electronics Letters, vol. 22, No. 25, Dec. 4, 1986.*

Shingyouchi et al., "Determination of Diffusion Coefficient of Titanium Ion in $TiO_2$-$Sio_2$ Wet Gel Prepared from Metal Alkoxides During Leaching", *Journal of Non-Crystalline Solids*, vol. 100, pp. 383-387, 1988.

Konishi et al., *r*-Grin Glass Rods Prepared by a Sol-Gel Method, *Journal of Non-Crystalline Solids*, vol. 100, pp. 511-513, 1988.

Chinese Office Action issued Sep. 7, 2007 (with English language version) in Chinese Application No. 200480026727.1, which is a foreign counterpart to the present U.S. application.

* cited by examiner $$n = n_0\{1 - g^2(x^2+y^2)/2\}$$
$$g = (n_0^2 - n_d^2)^{1/2}/dn_0$$
$$= NA/dn_0$$

OPTICAL FIBER COUPLING PART

BACKGROUND OF THE INVENTION

1. Field of the Invention

The present invention relates to an optical fiber coupling part for coupling a light emitting source such as a semiconductor laser used for optical communication and an optical fiber with high coupling efficiency.

2. Description of the Related Art

A technique for coupling a semiconductor laser and an optical fiber with high coupling efficiency is one of the most important techniques in optical communication. For example, conventional methods of coupling the semiconductor laser and the optical fiber include a method using a lens such as a spherical lens and an aspherical lens, or a method using a tip ball fiber whose tip part is spherical (see U.S. Pat. No. 3,910,677). The method using the lens involves problems in that mutual alignment of the optical axes of the semiconductor laser, the lens, and the optical fiber is complicated, enlarging the entire body of the coupling system at the same time, thereby increasing the manufacturing cost, while relatively high coupling efficiency is obtained. In addition, since the dimension of the lens is large and a disposition space is thereby largely occupied, this method can not be used for coupling a semiconductor laser array and an optical fiber array in which a plurality of semiconductor lasers and a plurality of optical fibers are arranged at short intervals. Meanwhile, since formed in small size, the method using the tip ball fiber is capable of coupling the semiconductor array and the optical fiber array. The aforementioned optical fiber is integrally formed with a hemispherical lens part at the tip of a single mode optical fiber. Meanwhile, when making the tip ball optical fiber, a problem is that conventionally the tip part of the fiber is polished around, and therefore mass-productivity is deteriorated and it takes significant labor hours to produce. Another problem is that, since the tip of the optical fiber is spherical, coupling efficiency is deteriorated due to spherical aberrations. Specifically, light beam emitted from a laser end face reaches the end face of the single mode optical fiber at different positions and at different angles, depending on the exiting angle of the outgoing light. Therefore, some of the light beams deviate from the core, or even when it reaches the core, an incident angle to the core is equal to or larger than a critical angle, and therefore the light is not propagated through the single optical fiber to deteriorate coupling efficiency. For example, when a standard semiconductor laser is used, the coupling loss is approximately 6 dB.

In order to solve the above-described problems, a columnar graded index lens (called "GRIN lens" hereafter) facilitating optical axis alignment is used. The GRIN lens is the lens using medium materials not uniform in refractive index (refractive index becomes larger toward the center of the lens), and functions as a lens whose refractive index is continuously changing. Refractive index distribution n (r) of the GRIN lens in a radius direction is expressed by the following formula:

$$n(r) = n_0(1 - (1/2)(gr)^2)(\text{FIG. 1})$$

where, n (r) is a constant expressing the refractive index at distance r from the center, $n_0$ is a constant expressing the refractive index at the center part, and g is a constant expressing a light-condensing performance of the GRIN lens. The above-described lens has relatively small spherical aberrations. However, the critical angle of the conventionally existing GRIN lens is made small, set to be 20° or less. Thus, such a lens can not sufficiently take in lights emitted from the semiconductor laser for optical communication, whose standard radiation full angle at half maximum θ is approximately 25°, thereby increasing the coupling loss. Therefore, a ball lens and the GRIN lens are frequently used in combination. However, in this case, it is difficult to align the optical axis, thereby increasing the assembly cost. Moreover, it is designed so that the tip of the GRIN lens is cut in spherical shape to increase NA in appearance (to improve the light-condensing performance). However, the problems are that mass-productivity is deteriorated and it takes significant labor to produce, thereby increasing the manufacturing cost. Further, the GRIN lens is conventionally made of a multi-component glass, and its softening point is about 500 to 600° C. Therefore, such a GRIN lens can not be fusion-spliced with the optical fiber, which is mainly composed of quartz glass. Thus, an optical adhesive is used, thereby posing problems in that it is difficult to align the optical axis, and an optical characteristic is deteriorated by a change in the quality of the adhesive caused by temperature-raise, when the adhesive absorbs the light and high intensity light thereby enters.

In order to solve such a problem of connection deterioration, a structure using GI (Graded-Index) optical fiber as a lens has been proposed (see U.S. Pat. Nos. 4,701,011 and 5,384,874).

The GI optical fiber is the optical fiber in which the refractive index of a core part changes in a radial direction. Since the GI optical fiber is made of the same quartz as the optical fiber, the GI optical fiber can be fusion spliced with the optical fiber. Therefore, it can be expected that the GI optical fiber will have high durability against light of high intensity. However, in this case, the critical angle of the GI optical fiber is made small, set to be 20° C. or less, (light-condensing performance is small), and therefore it is difficult to sufficiently take in the light emitted from the semiconductor lens for optical communication, whose standard radiation full angle at half maximum 0 is approximately 25°, and therefore the coupling loss is large, and handling property is low when actually assembled as a lens.

In order to solve the above-described problems, it is desired to develop a GRIN lens having light-condensing performance (high numerical aperture) which is high enough to sufficiently cover the emission angle of a semiconductor laser. Particularly, a standard radiation full angle at half maximum of a semiconductor laser is equal to 25° or larger. Therefore, in order to sufficiently guide the light of the semiconductor laser to the GRIN lens, it is necessary to develop a GRIN lens having a critical angle of at least 25° or larger. The critical angle corresponds to a maximum angle formed with an axis which allows the light to enter the optical fiber and the GRIN lens, when the light enters the optical fiber and the GRIN lens at an angle relative to the axis. Usually, a sine function of the critical angle is referred to as numerical aperture (referred to as "NA" hereafter). When the radiation full angle at half maximum of the semiconductor laser is 25°, the numerical aperture NAs is 0.43. Therefore, when the GRIN lens having NA which is equal to 0.43 or larger is used, all the lights of the semiconductor laser can enter the lens. Thus, such a GRIN lens is required. In addition, in order to facilitate the optical alignment of the axes of the semiconductor laser, the GRIN lens, and the optical fiber, a coefficient of thermal expansion of the GRIN lens needs to be set at $15 \times 10^{-7} K^{-1}$ or less, while the coefficient of thermal expansion of quartz is set at $5 \times 10^{-7} K^{-1}$. The above-described fusion splicing is a required technique for improving productivity, and by the fusion-splicing, the light reflected from a boundary surface between the optical fiber and the lens and returned to the semiconductor laser is reduced, to solve the problem that the optical characteristic is deteriorated by a change in the quality of the adhesive caused by temperature-raise, when the adhesive absorbs the light, and high intensity light enters. In addition, if the optical fiber and the GRIN lens having approximately the same sectional shape are fusion-spliced under flame using an oxyhydrogen burner, etc., due to a self-aligning effect (effect that center axes of both of the optical fiber and the GRIN lens are naturally coincident with each other by the surface tension of fused glass), the center axes of the optical fiber and the lens are coincident with each other without accurate axis aligning which has been a long-pending problem, thereby obtaining a large advantage in that the assembling property is significantly improved.

A method of efficiently condensing the light of the semiconductor laser by using the GRIN lens having high light-condensing performance as described above, includes the method of directly fusion-splicing the GRIN lens having high NA with the tip of the optical fiber. However, in this case, the coupling loss of about 3-4 dB must be expected. The reason is that, although the light radiated from the end face of the semiconductor laser is condensed on the end face of the single mode optical fiber by the light-condensing effect of the GRIN lens having high NA, a part of the light having a large emission angle reaches an angle that is larger than the critical angle of the optical fiber. Particularly, the problem is that, when the critical angle of the semiconductor laser (sine function of this critical angle=numerical aperture called NAs) is larger than the critical angle of the optical fiber (sine function of this critical angle=numerical aperture called $NA_f$), the light deviates from the core of the optical fiber depending on the emission angle of the light beam, or even if the light reaches the core, the incident angle to the core is equal to the critical angle or larger, thereby failing with regard to entering the single mode optical fiber and deteriorating the coupling efficiency.

In order to solve the above-described problem, an optical fiber with lens has been proposed (see Japanese Patent Laid Open No. 8-292341). In the optical fiber with lens, one end of the single mode optical fiber having a core and a clad and the other end of the coreless optical fiber are connected by a 2nd square type optical fiber (corresponding to GRIN lens). The 2nd square type optical fiber has a 2nd square type refractive index distribution of length of nearly ¼ as long as a zigzag cycle of a light beam propagated through the lens or the length of an odd number times of the length of ¼ of the zig-zag cycle. The optical fiber with lens is formed by connecting the 2nd square type optical fiber (corresponding to GRIN lens) having 2nd square type refractive index distribution of length of nearly ¼ as long as a zigzag cycle of a light beam propagated through the lens or the length of an odd number times of the length of the ¼ of the zig-zag cycle, to the single mode optical fiber having the core and the clad. Here, the 2nd square type optical fiber has the core and the clad, and the tip is formed in semi-spherical shape. By using the above-described optical fiber, the coupling loss is reduced to approximately 4 dB when coupled to the semiconductor laser, which is not enough to satisfy the coupling loss (3 dB or less) required practically. Generally, the smaller the coupling loss of the semiconductor laser and the optical fiber, the higher the performance of an optical communication system becomes, thereby also facilitating system construction. In addition, the tip is formed in semi-spherical shape with low yield ratio at a high cost. In order to not significantly lower the coupling efficiency of the lens having semi-spherical tip and the semiconductor laser, distance between the semi-spherical lens and the semiconductor laser, in other words, operating distance must be approximately 10 μm. Therefore, a disadvantage is that when constructing a coupling system of coupling the optical fiber with semi-spherical lens and the semiconductor laser, the semiconductor laser and the semi-spherical lens collide with each other, resulting in being unusable.

However, a conventional technique relating to the optical fiber with lens can not simultaneously satisfy requirements such as realizing more reduced coupling loss, further facilitating aligning of the optical axes of a semiconductor laser, a lens, and an optical fiber, while maintaining a long operating distance. In view of the above-described problems, the present invention is provided, and an object of the present invention is to provide the optical fiber with a GRIN lens and a laser module capable of reducing the coupling loss while maintaining a long operating distance and having a good module assembling property.

SUMMARY OF THE INVENTION (Structure 1)

A first structure of the present invention provides an optical fiber coupling part, wherein at least one GRIN lens having a numerical aperture NA larger than the numerical aperture NAs of a light emitting source (such as semiconductor laser) is fusion-spliced with one end of the optical fiber.

The optical fiber part of the present invention functions to efficiently send light emitted from a light emitting source to the optical fiber for optical communication, by arranging the end part of the GRIN lens opposed to the light emitting source, and connecting the optical fiber for optical communication to the other end. The GRIN lens, as described above, is the lens using medium materials that are not uniform in refractive index (refractive index becomes larger toward the center of the lens), and functioning as a lens having continuously changing refractive index. FIG. 1 is an explanatory view of the GRIN lens, illustrating a refractive index distribution in a radius direction in the left side, and illustrating its perspective view in the right side. As shown in FIG. 1, the GRIN lens has a 2nd square type refractive index distribution. The numerical aperture NAs of the light emitting source (such as semiconductor laser) is a sine function of a critical angle of a radiation full angle at half maximum, and the numerical aperture NA of the GRIN lens is a sine function of a critical angle of the GRIN lens. The light emitting source having larger numerical aperture spreads the light in a larger area, and the GRIN lens having larger numerical aperture has a higher light-condensing performance.

Conventionally, there exists no GRIN lens having numerical aperture NA larger than the numerical aperture NAs of the semiconductor laser and capable of being fusion-spliced with the optical fiber. However, such a GRIN lens can be manufactured by methods and embodiments as will be described hereunder. Since the numerical aperture of the GRIN lens is larger than the numerical aperture of the light emitting source, all of the light emitted from the light-emitting source can enter the GRIN lens, thereby reducing the loss of the light.

(Structure 2)

A second structure of the present invention provides the optical fiber coupling part according to the first structure, wherein a numerical aperture NA is equal to 0.43 or larger. As described above, the numerical aperture of a general light emitting source (semiconductor laser) is 0.43, and therefore by setting the numerical aperture of the GRIN lens at 0.43 or more, the numerical aperture larger than the general light emitting source is obtained.

(Structure 3)

A third structure of the present invention provides the optical fiber coupling part according to either of the first structure or the second structure, wherein a coefficient of thermal expansion of the GRIN lens is set at $15 \times 10^{-7} K^{-1}$ or less, and the optical fiber coupling part is provided by a sol-gel method. By setting the coefficient of thermal expansion of the GRIN lens at $15 \times 10^{-7} K^{-1}$ or less, the GRIN lens can be fusion-spliced with the optical fiber, which is a quartz glass without defect. Thus, productivity is excellent (for example, optical axis aligning is eliminated and high yield ratio is thereby obtained), and problems such as change in the quality of a connection part between the GRIN lens and the optical fiber, and the loss of light can be solved. The GRIN lens having such a thermal expansion ratio can be manufactured by the sol-gel method. The sol-gel method will be explained in detail hereunder.

It is extremely difficult to form a GRIN lens having the same coefficient of thermal expansion as that of quartz glass, by a conventional ion exchanging method or chemical vapor deposition. The GRIN lens made by the ion exchanging method is multi-component glass containing an alkaline component having an extremely large coefficient of thermal expansion, thereby posing a problem such as reliability over heat resistance. Also, in the chemical vapor deposition, 0.38 NA (for example, see the document; P.B.O' et al.: ELECTION. Lett., 13 (1977) 170-171) is obtained. However, if an amount of an additive (such as $GeO_2$, $P_2O_5$) is increased for the purpose of obtaining NA larger than 0.38, the coefficient of thermal expansion becomes larger, thereby easily breaking a preform. As described above, the problem is poor matching of the coefficient of thermal expansion with the preform.

Only one method capable of solving such a problem is a sol-gel method based on a low temperature synthetic method. In the sol-gel method, an acid or a base abduct salt is added as a solvent into an alcoholic solution mainly composed of alkoxide ($Si(OR)_4$ (R: alkyl group)) of silicon, so that the alcoholic solution is hydrolyzed by the acid or the base abduct salt to form a sol. When a multi-component glass is formed, a metal component is further added, to subject the sol to further polycondensation, thereby advancing crosslinking reaction to form a wet gel. Then, by drying the wet gel thus obtained and by baking the dried gel after removing the solvent in the gel, a dense glass is formed. When the GRIN lens is formed by using the sol-gel method, concentration distribution needs to be formed in the metal component. Since the refractive index becomes larger in a part thick in concentration of the metal component, the concentration of the center part of the GRIN lens is made thick in a profile of making the concentration thin toward outside. A raw material of the metal component includes a method using a metal alkoxide or metal salt, and further includes a molecule staffing method and the like.

In order to examine the metal component to be added into the GRIN lens of the present invention for examining the metal component for enlarging the refractive index, the refractive index of a binary quartz glass is expected by using the calculating formula of the well-known Lorentz-Lorenz. Then, candidates of the metallic additive components of the GRIN lens include the group of $SiO_2$—$Bi_2O_3$, —$In_2O_3$, —$Y_2O_3$, —$La_2O_3$, —$Ga_3O_2$, —$Sb_3O_2$, —$Gd_3O_2$, —$Nb_2O_5$, —$SnO_2$, —$Ta_2O_5$, —$TiO_2$, and —$ZrO_2$. Among the above components, it was clarified that composition containing Bi, In, Y, and La was a slightly alkoxide soluble solid, allowing no gel to be formed. Also, the composition containing Gd and Ga, has only numerical aperture (NA) 0.3 or less in a region with less additive (an amount of the additive to be added to Si is 20 mol % or less). Further, the Nb and Sn added glass has a crystalline substance recognized therein and has a large coefficient of thermal expansion, and is therefore unsuitable for the GRIN lens. Moreover, the Sb added glass and the Zr added glass exhibit instability in the process. Specifically, in the Sb added glass, an added element Sb is evaporated when the gel is baked, and in the Zr added glass, although small in quantity, precipitation is formed in methanol used as the solvent in the process of forming the gel.

From the examination result thus described above, $SiO_2$—$Sb_2O_3$, $SiO_2$—$Ta_2O_5$, $SiO_2$—$Ti_2O_3$, and $SiO_2$—$ZrO_2$ based quartz glass, further preferably, taking stability of the process into consideration, $SiO_2$—$Ta_2O_5$, $SiO_2$—$Ti_2O_3$ based quartz glass are preferable. When Ta: 10 mol % and Ti: 12 mol % are respectively added by the sol-gel method, it was found that the GRIN lens having high NA and the coefficient of thermal expansion approximating that of the quartz glass can be formed.

(Structure 4)

A fourth structure of the present invention provides an optical fiber coupling part, wherein a second GRIN lens having numerical aperture $NA_2$ is fusion-spliced with one end of the optical fiber having numerical aperture $NA_f$, and further a first GRIN lens having numerical aperture larger than $NA_2$ is fusion-spliced with the other end of the second GRIN lens.

In the optical fiber coupling part of the present invention, by arranging the end part of the first GRIN lens side so as to be opposed to a light-emitting source, and by connecting the optical fiber for optical communication to the other end, light emitted from the light-emitting source is efficiently sent to the optical fiber for optical communication. The light emitted from the light-emitting source sequentially passes through the first GRIN lens and the second GRIN lens, to enter the optical fiber. However, since the numerical aperture $NA_1$ of the first GRIN lens is larger than the numerical aperture $NA_2$ of the second GRIN lens, the GRIN lens having the larger numerical aperture (preferably a numerical aperture larger than the numerical aperture NAs of the light-emitting source) is adopted, and the light emitted from the light-emitting source can thereby efficiently enter the first GRIN lens. Also, since the numerical aperture NA2 of the second GRIN lens is smaller than NA1, the GRIN lens having sufficiently a small numerical aperture can be selected, and a critical angle of the light that reaches the optical fiber from the second GRIN lens can be made small (when the numerical aperture is small, zigzag cycle of the light moving through the GRIN lens becomes long, and the critical angle of the outgoing light from the GRIN lens becomes accordingly small). Therefore, the light efficiently enters the optical fiber from the second GRIN lens.

(Structure 5)

A fifth structure of the present invention provides the optical fiber coupling part according to the fourth structure, wherein the numerical aperture of the optical fiber ($NA_f$), the numerical aperture of the first GRIN lens ($NA_1$), the numerical aperture of the second GRIN lens ($NA_2$), and the numerical aperture of the light-emitting source ($NA_s$) are selected so as to satisfy the formula expressed by:

$$NA_f \leq NA_2 < NA_s \leq NA_1.$$

Since the formula expressed by $NA_s \leq NA_1$ is established, all of the light emitted from the light-emitting source enter the first GRIN lens, to thereby eliminate the loss of light. Also, since the formula expressed by $NA_f \leq NA_2 < NA_s$ is established, the critical angle of the light that reaches the optical fiber from the second GRIN lens becomes small, and therefore the light efficiently enters the optical fiber from the second GRIN lens. Accordingly, the light emitted from the light-source efficiently enters the optical fiber in total. Note that usually, equations expressed by $NA_f = 0.15$, and $NA_s = 0.43$ are established.

(Structure 6)

A sixth structure of the present invention provides the optical fiber coupling part according to either of the fourth structure or fifth structure, wherein the numerical aperture NA1 of the first GRIN lens is 0.43 or more. As described above, since the numerical aperture of a general light-emitting source (semiconductor laser) is 0.43, by specifying the numerical aperture of the first GRIN lens as 0.43 or more, the numerical aperture that is larger than the general light-emitting source is obtained.

(Structure 7)

A seventh structure of the present invention provides the optical fiber coupling part according to any one of the fourth structure to the sixth structure, wherein when the refractive index of the center of the glass is set at $n_0$, radius of the lens 1 is set at $d_1$, and distance between the GRIN lens and the light-emitting source is set at L, the length $Z_1$ of the first GRIN lens satisfies the formula expressed by:

$$Z1 = (n_o * d_1 / NA_1) \arctan(D_1 / NA_1 * L)).$$

When the expression $Z_1 = (n_o * d_1 / NA_1) \arctan(D_1 / NA_1 * L))$ is established, the light that enters the first GRIN lens becomes parallel light beams in the final end, and the parallel light beams efficiently enter the second GRIN lens. Also, along with the large numerical aperture of the first GRIN lens, the distance between the GRIN lens and the light-emitting source is made long, and the assembling property can thereby be improved.

(Structure 8)

An eighth structure of the present invention provides the optical fiber coupling part according to the seventh structure, wherein since the length $Z_2$ of the second GRIN lens has the length of nearly ¼ as long as a zigzag cycle of a light beam propagated through the lens or the length of an odd number times of the length of ¼ of the zig-zag cycle.

In the seventh structure, parallel light beams enter the second GRIN lens from the first GRIN lens. Since length $Z_2$ of the second GRIN lens is nearly ¼ as long as a zigzag cycle of a light beam propagated through the lens or the length of an odd number times of length of ¼ of the zig-zag cycle, the parallel light that enter is condensed in a center axis of an optical fiber 4 in the final end. At this time, since the light-condensing property of the second GRIN lens is smaller than that of the first GRIN lens, the lights are condensed at a loose angle, and therefore the lights efficiently enter the optical fiber.

(Structure 9)

A ninth structure of the present invention provides the optical fiber coupling part according to any one of the fourth structure to the eighth structure, wherein the coefficient of thermal expansion of the first and second GRIN lenses is expressed by $15 \times 10^{-7} K^{-1}$ or less and at least the first GRIN lens is formed by a sol-gel method. By setting the coefficient of thermal expansion at $15 \times 10^{-7} K^{-1}$ or less, the first and second GRIN lenses can be fusion-spliced with each other, and the second GRIN lens and the optical fiber, which is a quartz glass, can be fusion-spliced with each other without defects. Thus, productivity is excellent (optical axis aligning is eliminated and high yield ratio is thereby obtained, etc), and problems such as a change in quality of a connection part between the GRIN lens and the optical fiber, and the loss of light can be solved. The first GRIN lens having such a coefficient of thermal expansion and having a large numerical aperture can be manufactured by the sol-gel method. The second GRIN lens having a small numerical aperture can also be manufactured by the conventional well-known method.

(Structure 10)

A tenth structure of the present invention provides the optical fiber coupling part according to any one of the first structure to ninth structure, wherein the optical fiber is a single mode optical fiber. In the coupling part of the present invention, a most general single mode optical fiber can be used as an optical fiber. The single mode optical fiber usually comprises a core of the center part having relatively large refractive index, and clads having relatively small refractive index around the core, and the diameter of the core is about 10 μm, and the diameter of the clad (diameter of the fiber) is about 125 μm.

According to the optical fiber coupling part with GRIN lens, a coupling profile can be made to have substantially the same thickness as that of the optical fiber, thereby providing a small coupling system in total. Therefore, the semiconductor array and the optical fiber array can be coupled to each other, so that a plurality of semiconductor lasers and a plurality of optical fibers are arranged at short intervals. The operating distance (distance between the lens and the light-emitting source) can be made large, thereby facilitating the assembly of the coupling system without damaging the lens, and the coupling loss can be significantly reduced. In addition, all the optical fiber coupling parts with GRIN lens of the present invention are optical fiber types, and can be formed by using the existing fusion splicing technique as it is, thereby having a significant effect that mass production is realized with easy manufacture.

DETAILED DESCRIPTION OF PREFERRED EMBODIMENTS

Figure 2:
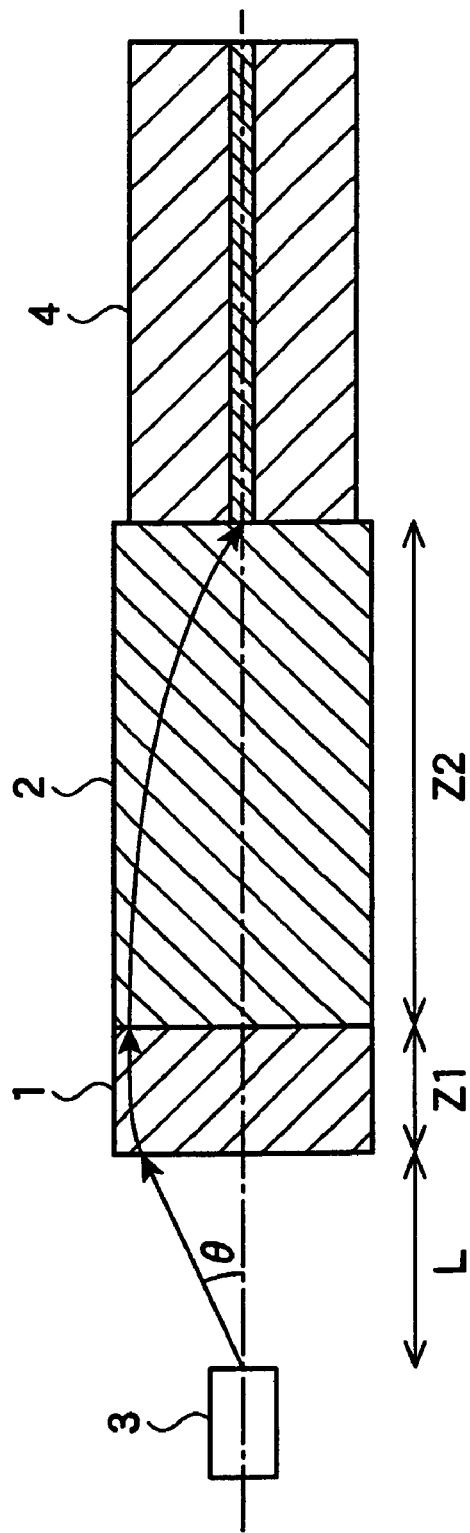
FIG. 2 is an explanatory view of an optical fiber coupling part of an embodiment.

Next, embodiments of the present invention will be explained based on FIG. 2. When specifying the distance between a semiconductor laser 3 and a first GRIN lens 1 as L, light emitted from the semiconductor laser 1 at radiation full angle at half maximum θ corresponding to NAs is received by the first GRIN lens 1 so as to be propagated through the first GRIN lens 1. At this time, the refractive index of the center part of the first GRIN lens 1 is set at $N_o$, and the radius is set at $d_1$, and when solving a beam equation in the first GRIN lens 1, by adjusting the length $Z_1$ of the first GRIN lens 1 like:

$$Z_1 = (n_o * d_1/NA_1) \text{ARCTAN}(D_1/(NA_1 * L)) \quad (1),$$

all the light beams propagated through the length of $Z_1$ within the radiation full angle at half maximum θ become parallel to the optical axis of the optical fiber. However, in order to prevent the condition that the light emitted from the semiconductor laser, reaches the side face of the GRIN lens 1 of radius $d_1$ and is kicked by the side face, under formula expressed by:

$$NA_1 \geq NA_s \quad (2),$$

formula expressed by:

$$d_1 \geq L/(1/NA_s - 1/NA_1)^{1/2} \quad (3)$$

may be approximately satisfied. As clarified by the formulas (1), (2), (3), particularly when formula, $L/d_1 << 1$ is satisfied, formula expressed by $Z_1 \sim (n_o * d_1/NA_1)*(\pi/2)$ is obtained, and therefore under the condition of (2), even if radius d is set to be any value, the light that enters the GRIN lens 1 is not kicked by the side wall of the GRIN lens 1.

Next, the parallel light beams thus obtained are caused to enter the second GRIN lens 2 (called $NA_2$) having the same or slightly larger NA as the optical fiber 4 having $NA_f$, which is expressed by:

$$NA_f \leq NA_2 \quad (4).$$

At this time, in order to prevent all the parallel light beams of the first GRIN lens 1 from being kicked by the side wall of the second GRIN lens so as to be taken in the second GRIN lens having radius $d_2$ and numerical aperture $NA_2$, when solving beam equations in the first GRIN lens and the second GRIN lens, radius d1 and radius $d_2$ may be specified so as to satisfy the formula expressed by:

$$8NA_f/NA_2)*(D_2/D_1) \geq NA_s((L/d_1)^2 NA_1 + 1/NA_1) \quad (5).$$

Particularly, as clarified from formula (5), when formula $L/d_1 << 1$ is established, radius $d_1$ and radius $d_2$ may be determined so as to satisfy the formula expressed by:

$$d_2/d_1 \geq (NA_2/NA_f)*(NA_s/NA_1) \quad (6).$$

When length $Z_2$ of the second GRIN lens 2 is set to be nearly ¼ as long as a zigzag cycle of a light beam propagated through the second GRIN lens 2 as expressed by:

$$Z_2 = (n_o * d_2/NA_2)*(\pi/2) \quad (7),$$

or set to be the length odd number times of it, the lights are condensed in the center axis of the optical fiber 4 at a loose angle by the second GRIN lens 2 having a smaller light-condensing property compared with the light-condensing property of the first GRIN lens 1. Particularly notable is that the angle formed by the light condensed in the center axis of the optical fiber 4 and the center axis is the same or slightly smaller than the critical angle of the optical fiber due to the small light-condensing performance of the second GRIN lens. Therefore, almost all of the light beams are received by the optical fiber, and the coupling efficiency is thereby remarkably improved.

Of course, since the first GRIN lens 1, the second GRIN lens 2, and further the optical fiber 4 are fusion-spliced, the reflection loss on each splicing surface reaches substantially zero. In short, in order to remarkably improve the coupling efficiency particularly under $L/d_1 << 1$, preferably the first and second GRIN lenses 1 and 2 satisfying the formulas expressed by:

$$NA_f \leq NA_2 < NA_s \leq NA_1 \quad (8)$$

$$d_2/d_1 \geq (NA_2/NA_f)*(NA_s/NA_1) \quad (9)$$

are fusion-spliced with tip of the optical fiber 3.

In view of the structure described above, an explanation will be provided of a case of the formula satisfying $L/d_1 << 1$. First, the operating distance L (for example 30 μm), allowing the optical fiber with GRIN lens to easily approach the semiconductor laser, is determined. Next, the second GRIN lens 2 having radius $d_2$, and numerical aperture $NA_2$ satisfying the formula (8) is selected, and the length is set to be the length (formula (7)), which is nearly ¼ as long as the zigzag cycle of a light beam propagated through the second GRIN lens 2, or the length $Z_2$ which is an odd number times of it. Next, by using formula (9), radius $d_1$ of the first GRIN lens 1 is obtained. Usually, the radius is set to be $d_a = d_2$. The value thus obtained is substituted for formula (1), and length $Z_1$ of the first GRIN lens 1 is specified by using the operating distance. Thus, by specifying distance L between the first GRIN lens and the semiconductor laser, mutual contact or collision is eliminated when assembling. In addition, as clarified by formula (1), length $Z_1$ is not uniquely determined in property of an inverse trigonometric function, but is obtained by multiplying 7 times. However, although length $Z_1$ may be determined in consideration of the each of machining of the GRIN lens 1, preferably it is obtained by multiplying π-times.

Incidentally, the optical fiber 4 is explained as a single mode optical fiber. However, the optical fiber 4 is not limited to the single mode optical fiber, but may be a multi-mode optical fiber, provided that formula (8) is satisfied. In addition, in a high-output multi-mode LD, the ratio of a light-emitting region in a parallel direction to a light-emitting region in a vertical direction ranges from several tens:1 to several hundred:1, and in addition, vertically spreading angle θv and horizontally spreading angle θp of a laser beam are extremely different in relation to each other (θv>>θp). Therefore, in the above-described rotational symmetric optical system, it is difficult to cause LD laser beam to be efficiently guided into the optical fiber having a light incident aperture that has good symmetricalness (such as circular form). As a counter measure, a planar plate-like GRIN lens (called $NA_1$) having the same or a slightly larger numerical aperture NA as the NA (called $NA_s$) corresponding to the vertically spreading angle θv is inserted instead of the cylindrical first GRIN lens 1, and only vertically spreading angle θv may be adjusted by the first planar plate-like GRIN lens.

In addition, usually, the light emitted from the semiconductor laser has an elliptical shape. However, the first GRIN lens 1 is not limited to a cylindrical shape, but may have elliptical-shaped refractive index distribution. In any case, irrespective of the shape, by combination of the GRIN lenses satisfying formula (2), high coupling efficiency can be obtained.

Figure 1:
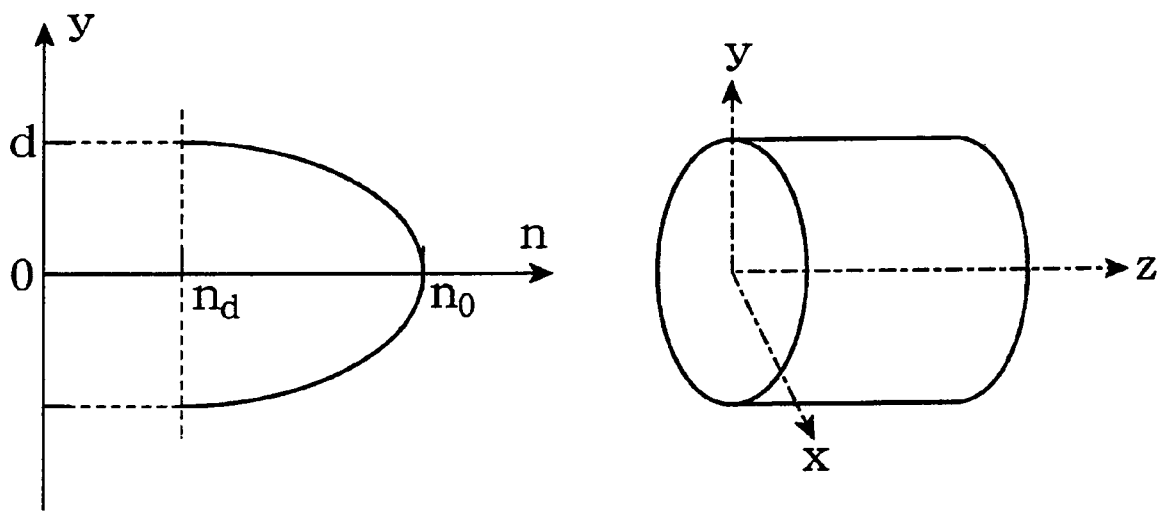
FIG. 1 is an explanatory view of a GRIN lens.
Figure 3:
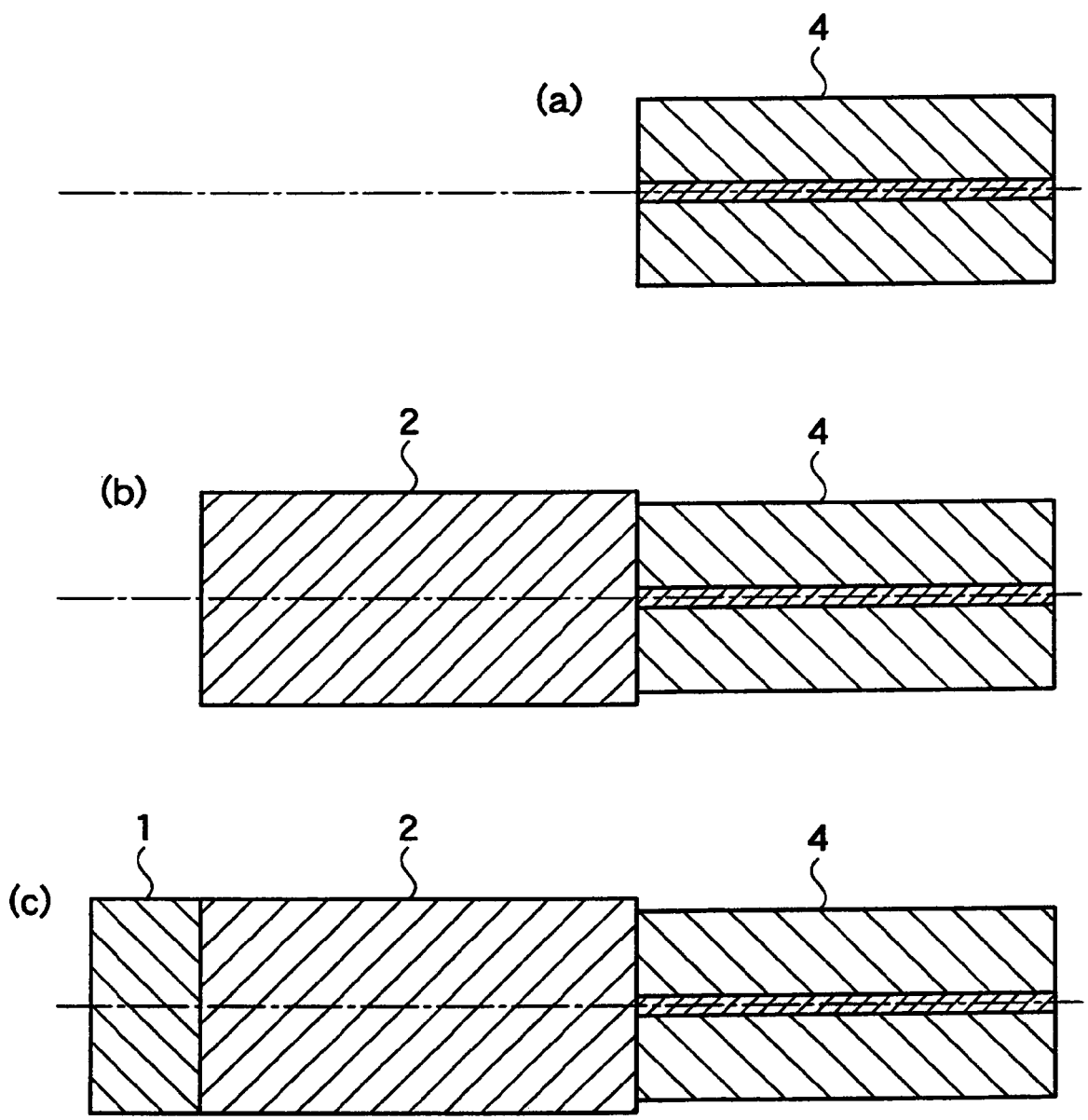
FIG. 3 is an explanatory view of a forming process of the optical fiber coupling part of an embodiment.

Next, a forming method of the embodiments of the present invention will be explained based on FIGS. 2 and 3. As shown in FIG. 1, in a semiconductor laser module (coupling system), a semiconductor laser 3 and the optical fiber 4 with first and second GRIN lenses are arranged so as to be opposed to each other while maintaining the operating distance of about 30 μm therebetween. In the semiconductor laser 3, for example, peak oscillation wavelength is set at 1330 m, operating current is set at 16 m A, operating voltage is set at 1.0 V, horizontally radiation full angle at half maximum is set at 20°, and vertically radiation full angle at half maximum is set at 25°. In the optical fiber with GRIN lens, the second GRIN lens 2 and the first GRIN lens 1 are connected in this order to one end of the single mode fiber 4 having cores and clads, and having a numerical aperture expressed by $NA_f=0.15$. Diameters of the first GRIN lens 1 and the second GRIN lens 2 are set at the same diameter or a slightly larger diameter than the diameter of the optical fiber 4. In the example of FIG. 2, the diameters of the GRIN lenses 1 and 2 are equally set at 150 μm, respectively, and numerical apertures $NA_1$ and $NA_2$ are set at 0.5 and 0.16, respectively. The second GRIN lens 2 has a length that is nearly ¼ as long as a zigzag cycle of a light beam propagated through the lens, and set at approximately 860 μm by formula (7). Meanwhile, the length of the first GRIN lens is obtained by the above described formula (1), and set at approximately 990 μm by multiplying π-times, here.

The optical fiber with GRIN lens thus structured, is manufactured as will be described below. First, as shown in FIG. 3B, the second GRIN lens 2 having 2nd square type refractive index distribution having numerical aperture satisfying $NA_2=0.16$ and diameter 150 μm is fusion-spliced with one end of the single mode optical fiber 4 having 125 μm diameter and numerical aperture satisfying $NA_f=0.15$ by using a fusion splicer. Thereafter, the second GRIN lens 2 and the single mode optical fiber thus fusion-spliced is cut in a 860 μm length which is nearly ¼ as long as a zigzag cycle of a light beam propagated through the second GRIN lens (FIG. 3B). Next, as shown in FIG. 3(C) a string material of the first GRIN lens 1 of proper length having numerical aperture satisfying $NA_1=0.5$ and the 2nd square type refractive index distribution of 150 μm diameter which are different from those of the second GRIN lens, is fusion-spliced with the second GRIN lens 2. Thereafter, by cutting and grinding the first GRIN lens 1, the length of the first GRIN lens 1 is made to be 990 μm long, and the optical fiber with GRIN lens is thereby obtained (FIG. 3C).

By using the above-described semiconductor laser module, the semiconductor laser was made to be opposed to the optical fiber with GRIN lens holding the distance of 30 μm therebetween, the semiconductor laser having radiation characteristics of 1330 nm peak oscillation wavelength, 16 mA operating current, 1.0V operating voltage, horizontally radiation full angle at half maximum 20°, and vertically radiation full angle at half maximum 25°, and the optical fiber having numerical aperture satisfying $NA_1=0.5$. Then, extremely high coupling efficiency with coupling loss of 1 dB or less was obtained, thereby verifying the superiority of the present invention.

Embodiment 1

2 normal hydrochloric acid 9.2 ml was added into a mixture of 75.5 ml silicon tetramethoxide and 183.4 ml isopropanol, and after stirring for 30 minutes, 9.8 ml titanium tetra-n-butoxide was added. Thereafter, 0.01 normal ammonia water was added, and stirred, to obtain a wet gel. After aging the wet gel at a temperature of 50° C. for two days, the wet gel is immersed in 6 normal hydrochloric acid for two hours, so that titanium on an outer periphery is eluted, and concentration distribution of titanium is imparted in the gel. After being immersed, the wet gel is dried at a temperature of 70° C., to obtain a dry gel having about 10 mm diameter. The dry gel thus obtained was subjected to temperature-raise from room temperature to 800° C. at a rate of 150° C./hr in an oxygen atmosphere, and thereafter to 1250° C. at a rate of 50° C./hr in a helium atmosphere, and then subjected to baking to obtain a transparent glass body. The refractive index distribution of the columnar glass body was measured, and as a result, the refractive index distribution of the preform of the second GRIN lens was obtained in the profile of substantially square curved decrease expressed by equation NA=0.16 from the center toward the periphery.

Next, 2 normal hydrochloric acid 9.2 ml was added into the mixture of 75.5 ml silicon tetramethoxide and 183.4 ml isopropanol, and after stirring for 30 minutes, 30.8 ml titanium tetra-n-butoxide was added. Thereafter, 0.01 normal ammonia water was added and stirred, to obtain wet gel. After aging the wet gel at a temperature of 50° C. for two days, the wet gel was immersed in 6 normal hydrochloric acid for two hours, and the concentration distribution of titanium was imparted in the gel. After being immersed as described above, the gel was immersed in methanol, and hydrochloric acid wash in the gel was conducted. Thereafter, the gel was immersed in 6 normal hydrochloric acid for 20 minutes, and the second concentration distribution was imparted, and in the same way as the first time, the gel was immersed in the methanol and hydrochloric acid wash in the gel was conducted, and then dried. The gel thus dried was immersed in 6 normal hydrochloric acid for 8 minutes, to impart a third concentration distribution. Then, the gel was immersed in methanol in the same way as the first time, and after hydrochloric acid wash, the gel was dried to obtain a dry gel having about 10 mm diameter. The dry gel thus obtained was subjected to temperature-raise from room temperature to 350° C. at a rate of 10° C./hr, thereafter, to 1200° C., and then subjected to baking to obtain a transparent glass body. The refractive index distribution of the columnar glass body was measured, and as a result, it was clarified that the preform of the first GRIN lens has the refractive index distribution in the profile of substantially square curved decrease expressed by equation NA=0.5, from the center toward the periphery. Thus, by imparting concentration distribution multiple times in a state of wet gel, the GRIN lens having large numerical aperture can be formed.

While these two preforms were inserted into an electric furnace of a carbon heater separately at a rate of 0.04 mm/s, the preforms were formed into a GRIN lens-like optical fiber having 150 μm outer diameter by spinning, and the first GRIN lens-like optical fiber and the second GRIN lens optical fiber were thereby formed. Then, the second GRIN lens-like optical fiber thus formed was fusion-spliced with one end of the single mode optical fiber having numerical aperture of 0.15 by using a discharge fusion splicer. Thereafter, the second GRIN lens-like optical fiber and the single mode optical fiber thus fusion-spliced was cut in a 990 μm length which is nearly ¼ as long as a zigzag cycle of a light beam propagated through the second GRIN lens. Next, the first GRIN lens-like optical fiber having numerical aperture 0.5 different from that of the second GRIN lens was fusion-spliced with the second GRIN lens by using the same discharge fusion splicer as used in the case described above. Thereafter, the first GRIN lens-like optical fiber and the second GRIN lens thus fusion-spliced was cut and ground so as to be 860 μm length, and the optical fiber coupling part with the first and second GRIN lenses of a first embodiment was thereby obtained.

The optical fiber coupling part thus obtained was opposed to the semiconductor laser having 1330 nm peak oscillation wavelength, 16 mA operating current, 1.0V operating voltage, horizontally radiation full angle at half maximum 20°, and vertically radiation full angle at half maximum 25°, holding operating distance of 30 μm therebetween, and in this case, high coupling efficiency with coupling loss of 0.9 dB or less was obtained.

Embodiment 2

First, in the same process as the first embodiment, after forming the preform of the second GRIN lens having numerical aperture satisfying NA=0.16, the preform was formed into the second GRIN lens-like optical fiber having 150 μm outer diameter by spinning in the electric furnace of the carbon heater.

Next, after 2 normal hydrochloric acid 9.2 ml was added into a mixture of 76.6 ml silicon tetramethoxide and 184.3 ml isopropanol, 50 ml superfine particulate silica was added to mix therewith, and the mixture thus obtained was stirred for 1 hour and partially hydrolyzed. Then, the solution was divided equally into eight parts, and added with titanium tetra-n-butoxide of concentration as shown in Table 1, to make eight kinds of sol from first layer to eighth layer with different titanium components at regular intervals. Thereafter, 0.01 normal ammonia water was added at regular intervals to adjust the sol.

Figure 4:
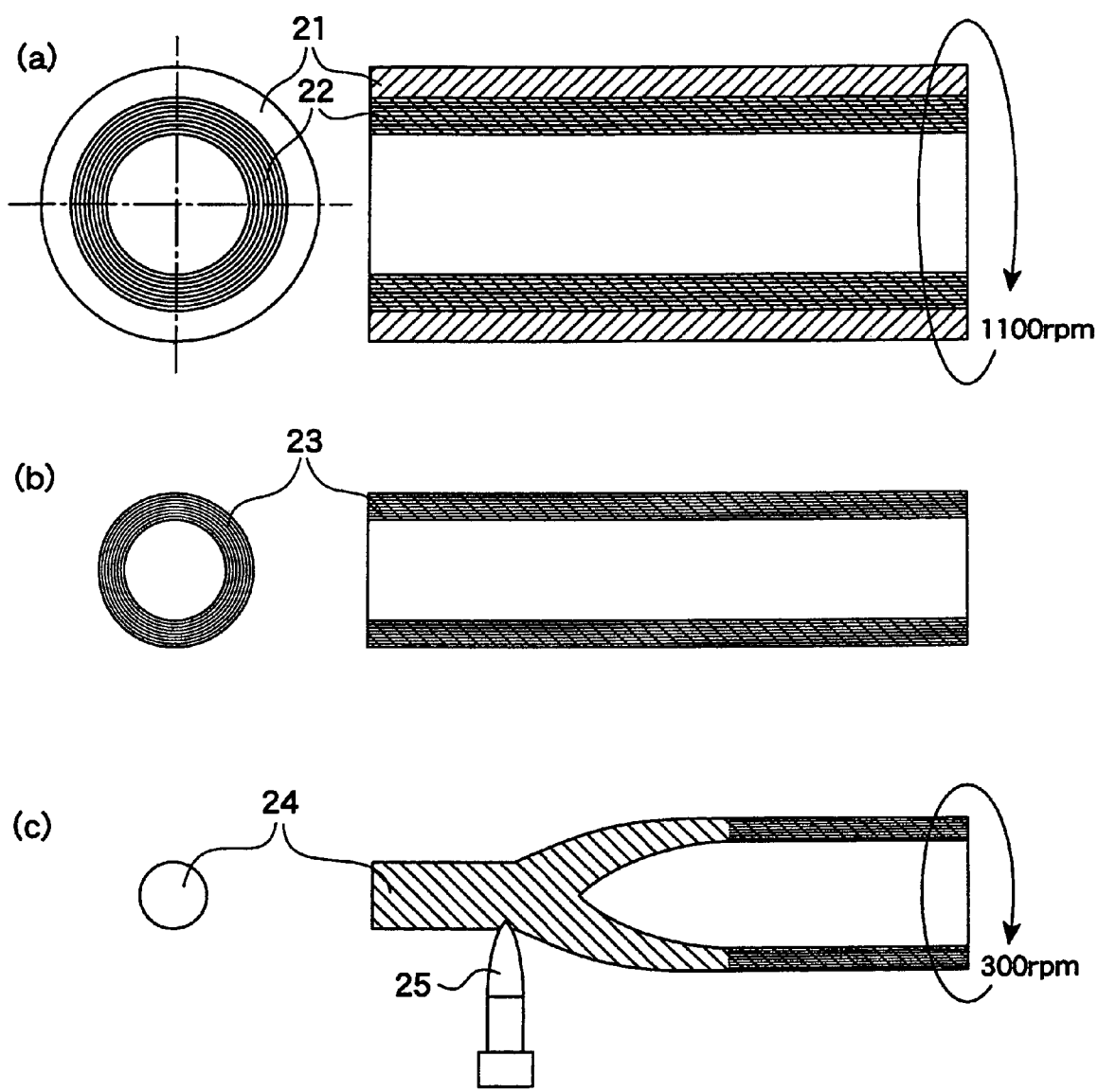
FIG. 4 is an explanatory view of the forming process of the GRIN lens.

First, the sol of the first layer was contained in a polypropylene vessel having a 50 mm inner diameter, and the sol thus contained was rotated at a rate of 1100 revolutions/min, for 30 minutes, and a cylindrical wet gel was formed on an inner wall of a cylindrical vessel 21. Thereafter, in a similar process, sol liquid with different titanium components from second layer to eighth layer were sequentially contained in the vessel 21 to concentrically laminate a wet gel layer 22 with different added amount of titanium of eight layers, on the inner wall of the vessel 21 (FIG. 4A). While the cylindrical wet gel thus made was rotated, the wet gel was dried at 60° C. for one week to obtain a dry gel. The dry gel was contracted and formed into a cylinder having a 13 mm inner diameter, 26 mm outer diameter, and 0.04% or less ellipticity. The dry gel thus obtained was subjected to temperature-raise to 800° C. at a rate of 150° C./hr in an oxygen atmosphere, and thereafter, to 1250° C. at a rate of 50° C./hr in a helium atmosphere, and then subjected to baking to obtain a transparent glass body 23. Both ends of the cylindrical glass body 23 was fixed to a lathe turning machine, and when the glass body 23 was sequentially heated from an end part while rotating, by using an oxyhydrogen burner 25 of about 2000° C., a cylindrical GRIN lens preform 24 with a closed inner diameter was obtained (FIG. 4C).

TABLE 1

|  | Titanium added amount |
| --- | --- |
| First layer | 0 ml |
| Second layer | 1.1 ml |
| Third layer | 1.6 ml |
| Fourth layer | 2.1 ml |
| Fifth layer | 2.6 ml |
| Sixth layer | 3.0 ml |
| Seventh layer | 3.5 ml |
| Eighth layer | 4.3 ml |

While the GRIN lens preform 24 was inserted into an electric furnace of a carbon heater at a rate of 0.04 mm/s, the preform was formed into the GRIN lens-like optical fiber having 150 μm outer diameter by spinning, and the first GRIN lens-like optical fiber was thereby formed. The refractive index distribution of the first GRIN lens-like optical fiber thus formed was measured, and as a result, the refractive index distribution of the first GRIN lens-like optical fiber was obtained in a profile of substantially square curved decrease expressed by numerical aperture satisfying NA=0.53 from the center toward the periphery. Here, at the time of spinning at 1900° C. or more, the titanium component in the center part slightly flies around, and therefore, as shown in table 1, the titanium added amount of the eight layers is increased to prevent deteriorating the refractive index.

The second GRIN lens-like optical fiber thus formed was fusion-spliced with one end of the single mode optical fiber having numerical aperture 0.15 by using the discharge fusion splicer. Thereafter, the second GRIN lens-like optical fiber and the single mode optical fiber thus fusion-spliced was cut in a 990 μm length which is nearly ¼ as long as a zigzag cycle of a light beam propagated through the second GRIN lens. Next, the first GRIN lens-like optical fiber having 0.53 numerical aperture different from that of the second GRIN lens was fusion-spliced with the second GRIN lens by using the same discharge fusion splicer as described before. Thereafter, the first GRIN lens-like optical fiber and the second GRIN lens thus fusion-spliced was cut and ground so as to be 840 μm in length, and the optical fiber coupling part of a second embodiment was obtained.

The optical fiber coupling part thus obtained was opposed to the semiconductor laser having 1330 nm peak oscillation wavelength, 16 mA operating current, 1.0V operating voltage, horizontally radiation full angle at half maximum 20°, and vertically radiation full angle at half maximum 25°, holding operating distance of 30 μm therebetween, and in this case, high coupling efficiency with coupling loss of 0.9 dB or less was obtained.

Embodiment 3

First, in the same process as the first embodiment, after forming the preform of the second GRIN lens having numerical aperture satisfying NA=0.16 was formed, the preform was formed into the second GRIN lens-like optical fiber having 150 μm outer diameter by spinning in the electric furnace of the carbon heater.

Subsequently, tantalum ethoxide was added to and mixed with 1.1 g silicon tetramethoxide by an amount of eight kinds shown in table 2, and 1.3 cc methanol was further added and mixed therein, and the mixture thus obtained was stirred. Thereafter, 0.3 g superfine particulate silica was mixed therein, and after stirring for one hour, 1.3 cc methanol and 0.3 cc pure water were mixed and delivered by drops therein to adjust the sol.

First, the sol of the first layer was contained in the cylindrical polypropylene vessel having 50 mm inner diameter, and the sol thus contained was rotated at a speed of 1000 revolutions per one minute for 30 minutes to form a cylindrical gel on the inner wall of the vessel. Thereafter, in the same process, sol liquid with different tantalum component from second layer to eighth layer was sequentially contained in the vessel to concentrically laminate a wet gel layer with different added amount of tantalum of eight kinds on the inner wall of the vessel. While rotating the cylindrical wet gel thus formed, the wet gel was dried at 60° C. for one week to obtain a dry gel. The dry gel was formed in a cylinder having 14 mm inner diameter, 25 mm outer diameter, and 0.04% or less ellipticity. The dry gel thus obtained was subjected to temperature-raise to 800° C. at a rate of 150° C./hr in an oxygen atmosphere, and thereafter, to 1250° C. at a rate of 50° C./hr in a helium atmosphere, and then subjected to baking to obtain a transparent glass body.

TABLE 2

|  | Tantalum added amount |
|---|---|
| First layer | 0 g |
| Second layer | 0.6 g |
| Third layer | 0.9 g |
| Fourth layer | 1.2 g |
| Fifth layer | 1.5 g |
| Sixth layer | 1.7 g |
| Seventh layer | 2.0 g |
| Eighth layer | 2.2 g |

From the cylindrical glass body, the closed cylindrical GRIN lens preform was formed in the same way as the embodiment 2, while the preform was inserted into an electric furnace of a carbon heater at a rate of 0.04 mm/s, the preform was formed into the first GRIN lens-like optical fiber having 150 μm outer diameter by spinning, and the first GRIN lens-like optical fiber was thereby formed. The refractive index distribution of the first GRIN lens-like optical fiber thus formed was measured, and as a result, it was clarified that the preform of the second GRIN lens had a profile of substantially square curved decrease expressed by numerical aperture satisfying NA=0.52, from the center toward the periphery. In a case of tantalum, the tantalum flying around was not checked, as described in the second embodiment.

The second GRIN lens-like optical fiber thus formed was fusion-spliced with one end of the single mode optical fiber having 0.15 numerical aperture by using the discharge fusion-splicer. Thereafter, the second GRIN lens-like optical fiber and the single mode optical fiber thus fusion-spliced was cut in a 990 μm length which is nearly ¼ as long as a zigzag cycle of a light beam propagated through the second GRIN lens. Next, the first GRIN lens-like optical fiber having numerical aperture 0.53 different from that of the second GRIN lens was fusion-spliced with the second GRIN lens by using the same discharge fusion-splicer. Thereafter, the first GRIN lens-like optical fiber was cut and ground so as to be 840 μm length, and the optical fiber coupling part of a third embodiment was obtained.

The optical fiber coupling part thus obtained was opposed to the semiconductor laser having 1330 nm peak oscillation wavelength, 16 mA operating current, 1.0V operating voltage, horizontally radiation full angle at half maximum 20°, and vertically radiation full angle at half maximum 25°, holding operating distance of 30 μm therebetween, and in this case, high coupling efficiency with coupling loss of 0.9 dB or less was obtained.

Embodiment 4

First, in the same process as the first embodiment, after forming the preform of the second GRIN lens having numerical aperture satisfying NA=0.16, the preform was formed into the second GRIN lens-like optical fiber having 150 μm outer diameter by spinning in the electric furnace of the carbon heater.

Next, silicon tetramethoxide, pure water, and hydrochloric acid were mixed at a molar ratio of 1:5:0.001, the mixture thus obtained was stirred until hydrolysis was completely ended, and sol liquid was thereby obtained. Thereafter, superfine particulate silica was mixed in the sol liquid so that a weight ratio to $SiO_2$ in the sol becomes 40%, and the mixture was adequately stirred. Thereafter, 0.1 normal ammonia water was added to and the sol was adjusted. The sol thus adjusted was contained in the cylindrical polypropylene vessel having 50 mm inner diameter, and the sol thus contained was rotated at a speed of 1000 revolutions per one minute for two hours, to make a cylindrical wet gel on the inner wall of the vessel. The 50 g wet gel was immersed in processing liquid 800 ml mixed with isopropanol and ascetone in which molecular sieve 3A was added, and the processing liquid was stirred for 24 hours. Thereafter, the processing liquid was replaced, and the same operation was repeated. Thereafter, solution mixed with 5 g titanium tetra-n-butoxide and 70 ml ethanol was poured into a cylinder shape and stirred for 5 hours, and the concentration distribution of titanium was imparted to the cylindrical wet gel. The gel was immersed in acetone, and titanium was fixed in the fine pores of the gel.

While rotating the cylindrical wet gel having the concentration distribution of titanium thus formed, the wet gel was dried at 60° C. for one week to obtain a dry gel. The dry gel was contracted and formed into a cylinder having a 13 mm inner diameter, a 26 mm outer diameter, and 0.04% or less ellipticity. The dry gel thus obtained was subjected to temperature-raise from room temperature to 800° C. at a rate of 150° C./hr in an oxygen atmosphere, and thereafter to 1250° C. at a rate of 50° C./hr in a helium atmosphere, and then subjected to baking to obtain a transparent glass body.

From the cylindrical glass body, in the same way as the second and third embodiments, the closed cylindrical GRIN lens preform was formed, and while the GRIN lens preform was inserted into an electric furnace of a carbon heater at a rate of 0.04 mm/s, the preform was formed into the GRIN lens-like optical fiber having a 150 μm outer diameter by spinning, and the first GRIN lens-like optical fiber was thereby formed. The refractive index distribution of the first GRIN lens-like optical fiber thus formed was measured, and as a result, the refractive index distribution of the preform of the first GRIN lens was obtained in the profile of substantially square curved decrease expressed by numerical aperture satisfying NA=0.48 from the center toward the periphery.

The second GRIN lens-like optical fiber thus formed was fusion-spliced with one end of the single mode optical fiber having numerical aperture 0.15 by using the discharge fusion splicer. Thereafter, the second GRIN lens-like optical fiber and the single mode optical fiber thus fusion spliced was cut in a 990 μm length which is nearly ¼ as long as a zigzag cycle of a light beam propagated through the second GRIN lens. Next, the first GRIN lens-like optical fiber having numerical aperture 0.48 different from that of the second GRIN lens was fusion-spliced with the second GRIN lens by using the same discharge fusion splicer as described before. Thereafter, the first GRIN lens-like optical fiber and the second GRIN lens thus fusion-spliced was cut and ground so as to be 890 μm length, and the optical fiber coupling part of a fourth embodiment was obtained.

The optical fiber coupling part thus obtained was opposed to the semiconductor laser having 1330 nm peak oscillation wavelength, 16 mA operating current, 1.0V operating voltage, horizontally radiation full angle at half maximum 20°, and vertically radiation full angle at half maximum 25°, holding operating distance of 30 μm therebetween, and in this case, high coupling efficiency with coupling loss of 0.9 dB or less was obtained.

Only the outer wall of the wet gel in which the titanium concentration distribution was fixed, and which is formed in the same way as the fourth embodiment, was immersed in 6 normal hydrochloric acid for 5 minutes, and a titanium additive fixed to the periphery of the wet gel was removed, thereby imparting a steep titanium concentration distribution. The wet gel thus obtained was immersed in methanol, and by washing the hydrochloric acid, the wet gel was dried to obtain a dry gel having 13 mm inner diameter and 26 mm outer diameter. The dry gel thus obtained was contained in a tubular furnace, and was subjected to temperature-raise from room temperature to 350° C. at a rate of 10° C./hr, and thereafter to 1200° C., and then subjected to baking to obtain a transparent cylindrical glass body. The glass body thus obtained was spun into 150 μm in the same way as the first embodiment, and the refractive index distribution was measured. As a result, the GRIN lens was obtained, having high numerical aperture 0.55 and refractive index distribution which was closer to a square curve than that of the first embodiment. In the same way as the first to fourth embodiments, when the optical fiber coupling part is formed by specifying the GRIN lens thus obtained as the first GRIN lens, the optical fiber coupling part having high coupling efficiency can be obtained.

Further, instead of using the titanium tetra-n-butoxide of fourth embodiment, tantalum propoxide $Ta(OC_3H_7)_5$ was used to fix the concentration distribution of tantalum, and then the wet gel was dried and baked. However, the refractive index distribution of the glass thus obtained had the profile of decreasing square curved refractive index distribution of numerical aperture satisfying NA=0.52. The GRIN lens thus obtained is specified as the first GRIN lens, and the optical fiber coupling part is formed in the same way as the first to fourth embodiments, and in this case, the optical fiber coupling part having high coupling efficiency can be obtained.

What is claimed is:

1. An optical fiber coupling part comprising:
   an optical fiber; and
   at least one GRIN lens having an unattached first end and having a second end fusion-spliced with an end of said optical fiber, said GRIN lens having a numerical aperture NA that is larger than a numerical aperture $NA_s$ of a light emitting source, wherein the numerical aperture NA is 0.43 or more, wherein said light emitting source comprises a semiconductor laser, and wherein a tip part of said unattached first end of said GRIN lens is flat.

2. The optical fiber coupling part according to claim 1, wherein the GRIN lens has a coefficient of thermal expansion expressed by $15 \times 10^{-7} K^{-1}$ or less, and is formed by a sol-gel method.

3. The optical fiber coupling part according to claim 1, wherein said unattached first end of said GRIN lens is arranged so as to directly receive light from said semiconductor laser.

4. An optical fiber coupling part comprising:
   an optical fiber having a numerical aperture $NA_f$;
   a first GRIN lens having a numerical aperture $NA_1$, said first GRIN lens having an unattached first end; and
   a second GRIN lens having a numerical aperture $NA_2$, wherein a first end of said second GRIN lens is fusion spliced with a second end of said first GRIN lens and a second end of said second GRIN lens is fusion spliced with an end of said optical fiber,
   wherein a tip part of said unattached first end of said first GRIN lens is flat, and wherein the numerical aperture $NA_f$ of the optical fiber, the numerical aperture $NA_1$ of the first GRIN lens, the numerical aperture $NA_2$ of the second GRIN lens, and a numerical aperture $NA_s$ of a light emitting source are selected to satisfy the formula expressed by:

$$NA_f \leq NA_2 < NA_s \leq NA_1,$$

wherein said light emitting source comprises a semiconductor laser.

5. The optical fiber coupling part according to claim 4, wherein the numerical aperture $NA_1$ of said first GRIN is 0.43 or more.

6. The optical fiber coupling part according to claim 4, wherein a length $Z_1$ of the first GRIN lens satisfies the formula expressed by:

$$Z_1 = (n_0 * d_1 / NA_1) \arctan(d_1 / (NA_1 * L))$$

wherein a refractive index of glass at a center part of the first GRIN lens is set at $n_o$, a radius of the first GRIN lens is set at $d_1$, and a distance between the lens and the semiconductor laser is set at L.

7. The optical fiber coupling part according to claim 4, wherein said first GRIN lens and said second GRIN lens have a coefficient of thermal expansion expressed by $15 \times 10^{-7} K^{-1}$ or less, and at least the first GRIN lens is made by a sol-gel method.

8. The optical fiber coupling part according to claim 4, wherein said unattached first end of said GRIN lens is arranged so as to directly receive light from said semiconductor laser.

* * * * *